US 8,546,012 B2

(12) United States Patent
Reber

(10) Patent No.: US 8,546,012 B2
(45) Date of Patent: Oct. 1, 2013

(54) BATTERY PACK WITH ELECTRONIC MONITORING DEVICE INTEGRATED IN THE HOUSING COVER

(75) Inventor: Volker Reber, Michelbach an der Bilz (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 636 days.

(21) Appl. No.: 12/709,817

(22) Filed: Feb. 22, 2010

(65) Prior Publication Data

US 2010/0221584 A1    Sep. 2, 2010

(30) Foreign Application Priority Data

Feb. 27, 2009 (DE) .......................... 10 2009 012 176

(51) Int. Cl.
*H01M 2/04* (2006.01)
*H01M 2/02* (2006.01)
*H01M 2/10* (2006.01)

(52) U.S. Cl.
USPC ............ 429/163; 429/175; 429/156; 429/159

(58) Field of Classification Search
USPC .............. 429/96–97, 99–100, 151–153, 156, 429/162–163, 175–177; 361/679.01–679.58, 361/724–747; 292/95, 96, 113–114, 100–101, 292/106–111, 137, 163–164, 174–175; 379/419, 428.01, 428.04; 455/575.1, 575.4
See application file for complete search history.

(56) References Cited

U.S. PATENT DOCUMENTS

| | | | | |
|---|---|---|---|---|
| 4,698,249 A * | 10/1987 | Brown | ............................. | 428/44 |
| 5,216,371 A * | 6/1993 | Nagai | ............................ | 324/428 |
| 6,407,925 B1 * | 6/2002 | Kobayashi et al. | ............ | 361/752 |
| 6,524,732 B1 * | 2/2003 | Iwaizono et al. | ................. | 429/7 |
| 6,808,844 B2 * | 10/2004 | Ehara | ............................ | 429/175 |
| 2003/0082439 A1* | 5/2003 | Sakakibara | .................. | 429/120 |
| 2005/0214597 A1* | 9/2005 | Kim et al. | ......................... | 429/7 |
| 2007/0205231 A1* | 9/2007 | Haul | ............................. | 222/544 |
| 2008/0113262 A1 | 5/2008 | Phillips et al. | | |
| 2008/0152994 A1* | 6/2008 | Yamagami et al. | ........... | 429/100 |
| 2008/0171235 A1* | 7/2008 | Seo et al. | .......................... | 429/7 |
| 2008/0254356 A1 | 10/2008 | Liersch et al. | | |
| 2010/0079934 A1* | 4/2010 | Nakamura et al. | ....... | 361/679.01 |
| 2012/0208048 A1* | 8/2012 | Ogura et al. | .................... | 429/7 |

FOREIGN PATENT DOCUMENTS

| | | |
|---|---|---|
| JP | 2007/0311706 A1 | 11/2007 |
| JP | 2008/066001 A1 | 3/2008 |
| WO | 2007/033689 A1 | 3/2007 |
| WO | 2008/018714 A1 | 2/2008 |
| WO | 2008/021964 A1 | 2/2008 |

* cited by examiner

*Primary Examiner* — Jonathan Crepeau
*Assistant Examiner* — Jacob Buchanan
(74) *Attorney, Agent, or Firm* — Gudrun E. Huckett

(57) ABSTRACT

A battery pack for an electric power tool has a housing and a housing cover that closes off the housing. Battery cells are arranged in the housing and electrically conductingly connected to one another. An electronic circuit for monitoring operating parameters of the battery cells is provided wherein the electronic circuit is mounted on a circuit board and is arranged in the housing. The housing cover has an inner side facing the battery cells. The inner side has a receptacle that is delimited by an outer receptacle rim. The circuit board is received in the receptacle and is spaced from a bottom of the receptacle so that a filling space is provided between circuit board, bottom of the receptacle, and the receptacle rim. A cured potting compound fills out the filling space.

22 Claims, 4 Drawing Sheets

BATTERY PACK WITH ELECTRONIC MONITORING DEVICE INTEGRATED IN THE HOUSING COVER

BACKGROUND OF THE INVENTION

The invention relates to a battery pack for an electric power tool, in particular hand-guided power tool, such as a hedge trimmer, a motor chain saw, a cut-off machine, a brush or grass trimmer or the like, comprising a housing with a housing cover, a plurality of individual battery cells arranged in the housing that are electrically conductingly connected to one another and an electronic circuit for monitoring operating parameters of the battery cells, the electronic circuit being disposed in the battery pack housing and arranged on a circuit board.

Battery packs are generally known and are comprised of a plurality of battery cells arranged in a battery pack housing and connected electrically in a suitable way parallel or in series with one another in order to provide a desired battery pack voltage or battery pack power.

As battery cells lithium ion, lithium polymer or the like cells are employed in order to obtain long operating times of the electric devices operated therewith.

Battery cells that are based on lithium require monitoring circuits in order to reliably prevent, on the one hand, exhaustive discharge that would destroy the battery cells and, on the other hand, to protect the cell by switching it off when currents are too high or temperatures are too high. Such protective circuits are comprised of electronic components arranged on a circuit board and are disposed together with the battery cells in the housing of the battery pack.

SUMMARY OF THE INVENTION

It is an object of the present invention to provide a battery pack of the aforementioned kind for an electric power tool in which the monitoring circuit is secured in the battery pack so as to be protected with regard to vibrations and environmental effects.

In accordance with the present invention, this is achieved in that the housing cover on an inner side that is facing the battery cells has a receptacle that is delimited by a receptacle rim. The circuit board is received in the receptacle and is arranged at a spacing relative to the bottom of the receptacle wherein between the circuit board, the bottom of the receptacle, and the receptacle rim a filling space is delimited and the filling space is filled with a cured potting compound.

The receptacle provided within the housing cover is positioned in the interior of the battery pack housing and receives the circuit board of the monitoring circuit completely. The circuit board is positioned approximately parallel to the end face of the housing cover at a spacing to the bottom of the receptacle so that between the circuit board, the bottom of the receptacle and the receptacle rim of the receptacle a filling space is delimited. Expediently, components of the electronic monitoring circuit that are supported on the circuit board are positioned within the filling space and are therefore facing away from the battery cells. The filling space is filled with a cured potting compound.

Providing the receptacle in the housing cover enables a safe and complete potting or embedding of the electronic components of the monitoring circuit so that it is mechanically fixedly connected to the housing cover and is completely protected with regard to environmental influences.

By means of spacers the circuit board is secured at a predetermined spacing relative to the bottom of the receptacle wherein expediently the spacers with their free ends engage positioning openings of the circuit board without play and align the circuit board in its position within the receptacle. In this way, a defined filling space is provided and, after it has been filled, a complete enclosure of the electronic components of the monitoring circuit is ensured.

Preferably, a portion of the receptacle rim of the receptacle is formed by a circumferential rim of the housing cover of the housing wherein the edge of the circuit board delimits particularly with the receptacle rim a preferably circumferentially extending gap. The receptacle rim may project past the circuit board wherein on the receptacle rim at least one holding-down device is provided that engages the facing edge of the circuit board. Preferably, on the opposed edge of the circuit board a locking hook that is in particular provided with a spring action is provided and attached to the receptacle; the locking hook engages the facing edge of the circuit board. In this way, the circuit board can be snapped into the receptacle wherein a floating action of the circuit board when filling in the potting compound is safely prevented by the holding-down devices and the locking hook. The displaced air and the potting compound can escape through the gap that is formed between the circuit board edge and the receptacle rim. A seal-tight complete enclosure (embedding) of each individual component on the furnished circuit board side is thus ensured.

Expediently, at the bottom of the receptacle a display element and/or an actuating element is provided that is surrounded by a sealing element which extends across the entire height of the filling space. The sealing element is comprised of foam material, in particular foam rubber, and is clamped between the circuit board and the bottom of the receptacle. In this way, a fixed positioning of the sealing element is ensured so that its positioning will not change, not even during pouring of the potting compound.

In a further embodiment of the invention, on the furnished circuit board side at least one connecting plug for connecting leads is provided so that after curing of the potting compound the plug with the connecting leads is disposed within the cured potting compound. The plug connection itself is thus protected from environmental influences such as corrosion or the like so that even under extreme conditions of use electrical contacting of the plugs is ensured.

DESCRIPTION OF THE PREFERRED EMBODIMENTS

Figure 1:
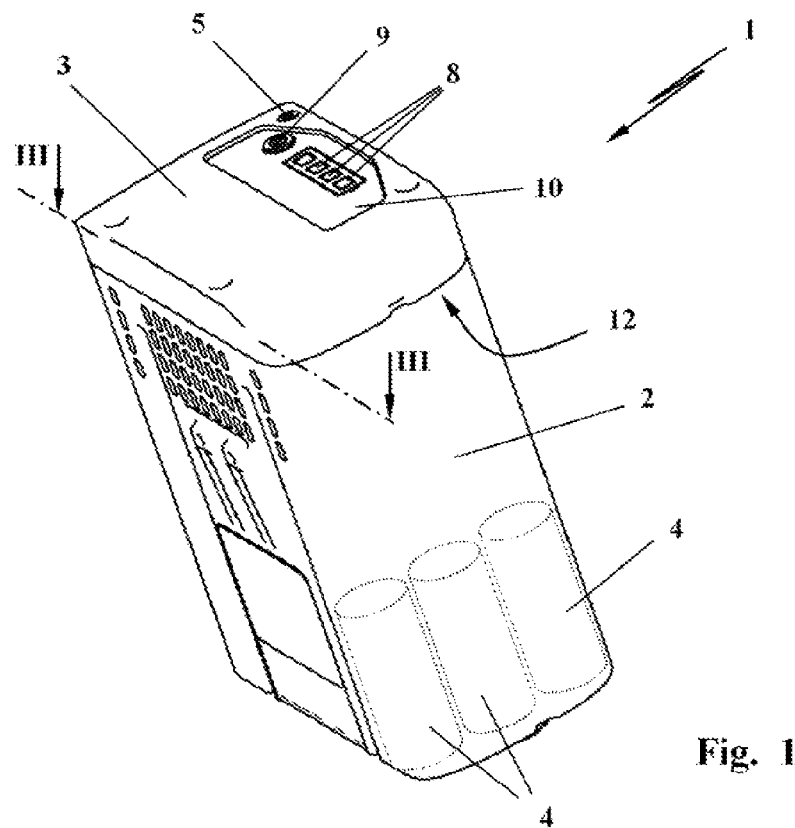
FIG. 1 is a perspective view of a battery pack comprising a battery pack housing with a housing cover.
Figure 2:
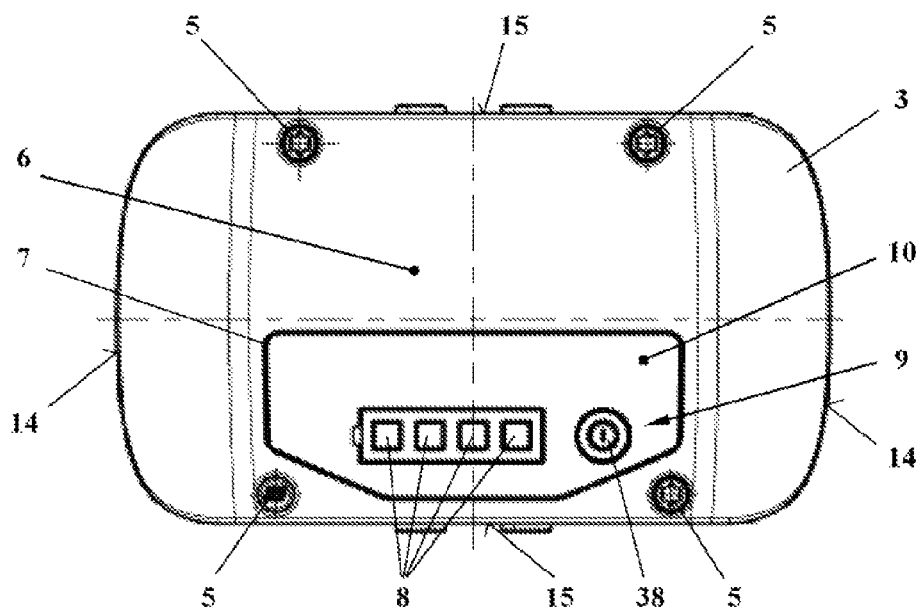
FIG. 2 is a plan view onto the housing cover according to FIG. 1.

FIG. 1 shows schematically a battery pack 1 in a perspective illustration. Such a battery pack serves as an energy source for an electric power tool, in particular for a hand-guided power tool such as a motor chain saw, a hedge trimmer, a cut-off machine, a grass or brush trimmer, an edger, a pole pruner, a blower, a sprayer, a vacuuming device, an earth auger, a multi-task power tool with multi-functional attachments, a sweeper, a rotary hoe, a rototiller (cultivator), a high-pressure cleaning device, a lawnmower, a dethatcher, a shredder or chopper, a wet/dry vacuuming device, or a similar power tool that is preferably portable.

The battery pack 1 is comprised of a housing 2 and a housing cover 3 that closes off the housing 2 wherein within the battery pack housing 2 a plurality of individual battery cells 4 are arranged in a vertical or horizontal orientation. The battery cells 4 are electrically conductingly connected to one another such that by using lithium ion, lithium polymer, or lithium iron phosphate cells with cell voltages between 3 volts and 5 volts, in particular between 3.6 volts and 3.7 V, a voltage of the battery pack of, for example, 36 volts at a power of, for example, 2.2 Ah is achieved. By changing the connections of the battery cells 4 with one another, it is also possible to provide lower or higher voltages with the same or higher power.

The housing cover 3 of the battery pack 1 in the illustrated embodiment is secured by means of fastening screws 5 on the battery pack housing 2. Other fastening means such as rivet connections, snap-on connections, an adhesive connection, a weld connection or the like may be expedient. On the end face 6 of the appropriately secured housing cover 3 a display and actuating array 7 is disposed. In the illustrated embodiment, the display and actuating array 7 is comprised of four display windows 8 as well as an actuating field 9. The display and actuating array 7 is adhesively covered by a flexible film 10 so that a complete sealing action relative to the environment is provided.

As shown in FIGS. 3 to 6, the housing cover 3 is provided on its inner side 12 that is facing the battery cells 4 with a receptacle 11 that (compare FIG. 3 and FIG. 4) is delimited by an outer receptacle rim 13. On the narrow sides 14 of the approximately rectangular housing cover 3 the receptacle rim 13 is physically embodied while on the longitudinal sides 15 of the housing cover it is formed partially by the housing cover rim 16. Thus, the circumferentially extending closed receptacle rim 13 is formed about a portion of the circumference by the housing cover rim 16 of the housing cover 3.

On one longitudinal side 15 of the receptacle rim 13 holding-down devices 17 are formed that project past the receptacle rim 13 into the receptacle 11. On the oppositely positioned longitudinal side 15 a locking hook 18 is provided that is embodied so as to be able to yield in a springy fashion in the direction of arrow 19 and is preferably positioned in the receptacle 11. The locking hook 18 is secured to the bottom 25 of the receptacle 11.

Between the holding-down devices 17 on the rim 13 a recess 20 is formed that serves for positionally precisely arranging a sealing element 21.

In the receptacle 11 a circuit board 22 is received that supports a monitoring and/or control circuit that monitors operating parameters of the battery cells 4 of the battery pack 1. On a furnished side 24 of the circuit board the electronic components 23 of the monitoring and/or control circuit are positioned. The furnished side 24 of the circuit board is positioned so as to face the bottom 25 of the receptacle 11 wherein, for positioning the circuit board 22 in the receptacle 11, spacers 26 are provided whose free ends 49 engage as positioning pins the positioning openings 27 of the circuit board 22. In the illustrated embodiment, the circuit board 22 is aligned by two positioning openings 27 position-precisely within the receptacle 11 wherein the positioning openings 27 are provided at opposite corners of the circuit board 22.

Moreover, the ends 49 of the spacers 26 that engage substantially without play, preferably with form fit, the positioning openings 27 rest moreover against the furnished side 24 of the circuit board so that the circuit board 22 is positioned at a predetermined spacing a relative to the bottom 25 of the receptacle 11. The spacing a selected such that none of the electronic components 23 will contact the bottom of the receptacle 11.

The circuit board 22 that is precisely positioned by the spacers 26 in the receptacle 11 is positioned with the circuit board edges 28, 29 at a spacing s to the receptacle rim 13 so that a gap 30, preferably a circumferentially extending gap, is formed between the circuit board edges 28 and 29 and the receptacle rim 13. The spacing s has a maximum size of approximately 0.5 mm to 3 mm, preferably approximately 1.5 mm.

Figure 5:
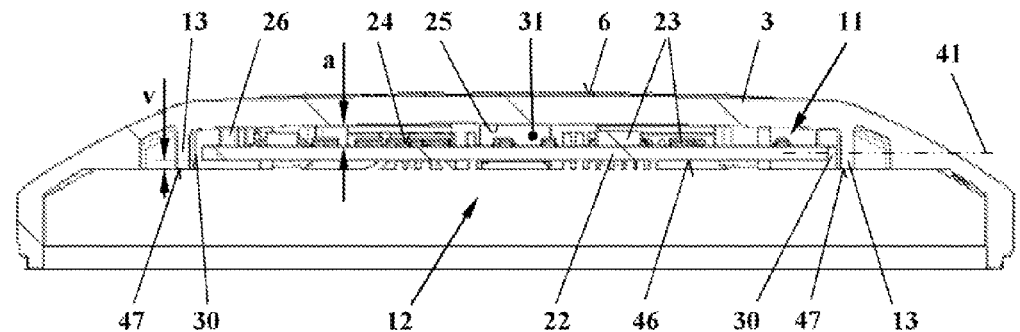
FIG. 5 is a section along the section plane V-V in FIG. 4.

The receptacle rim 13, as shown in particular in FIG. 5, projects by a length v past the circuit board 22 or the back 46 of the circuit board. The length v is within a range of approximately 0.5 mm to 2.5 mm, in particular approximately 1.6 mm.

As a result of the structural configuration of the receptacle 11 and the receptacle rim 13 as well as the circuit board 22 inserted into the receptacle 11 a filling space 31 is formed which is provided substantially with minimal height a and is expediently vented by the circumferential gap 30.

Figure 6:
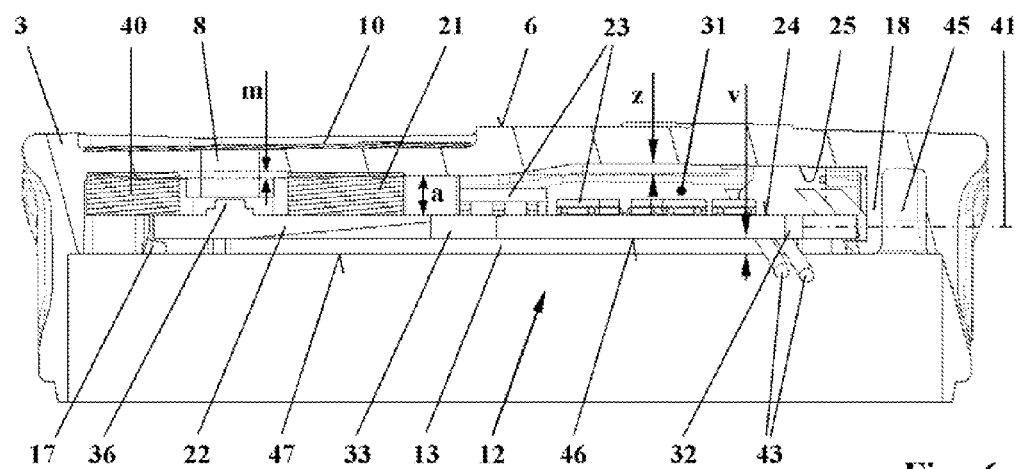
FIG. 6 is a section along the section plane VI-VI in FIG. 4.

It can be expedient to provide in the circuit board 22 at suitable locations venting openings 32 as well as a pouring opening 33 that should be, if possible, centrally arranged and by means of which the filling space 31 can be filled with a curable potting compound 35. Preferably, the potting compound 35 is heat-conducting. On the furnished side 24 of the circuit board, opposite the display windows 8, there are illumination means such as, for example, LEDs 36 by means of which the display windows 8 are made visible from the exterior. On the circuit board 22 there is moreover a pushbutton 34 with which the actuating field 9 can be operated from the exterior. In order to ensure that neither the display elements 37 in the form of LEDs 36 nor the actuating element 38 become unusable by the potting compound 35, the sealing element 21 is provided. The sealing element 21 can be embodied as a shaped part, for example, as a sealing frame with a sealing rim or a sealing lip or the like; in the illustrated embodiment the sealing element 21 is a shaped part and is comprised preferably of foam material, in particular foam rubber. It surrounds the display elements 37 and the actuating element 38 completely so that the spaces separated in this way remain free of the potting compound. It is provided that the sealing element 21 (see FIG. 6) extends across the entire height a of the filling space 31 wherein it is preferably clamped between the circuit board 22 and the bottom 25 of the receptacle 11. As can be seen in FIG. 6, the sealing element 21 is compressed by approximately 30% to 50%, in particular approximately 40%, with regard to its height which in the illustrated embodiment corresponds to a length m of approximately 1.2 mm. The height a of the filling space 31 is within a range of 0.5 mm to 3 mm; preferably the smallest height a is approximately 1.8 mm. The difference in height a is caused by a height variation z at the bottom 25 of the receptacle 11 (FIG. 6).

For mounting the circuit board 22 that comprises the monitoring and/or control circuit, the circuit board 22 with the furnished side 24 leading is inserted into the receptacle 11. First, the longitudinal edge 29 of the circuit board is placed underneath the holding-down devices 17 wherein positioning stays 39 facilitate the precise orientation of the circuit board 22 in the receptacle 11. The circuit board 22 is then pivoted about the edge 29 that is positioned underneath the holding-down devices 17 into the receptacle 11 wherein the free ends 49 of the spacers 26 as positioning pins preferably engage form-fittingly the positioning openings 27 of the circuit board 22. The locking hook 18 is forced back elastically (springy) by the circuit board edge until it snaps back across the edge of the circuit board; the circuit board 22 is thus secured captively and precisely positioned in the receptacle 11.

In order to ensure that, when inserting the circuit board 22 into the receptacle 11 or when filling in the potting compound 35 into the filling space 31, the sealing element 21 cannot slide out its position, the sealing element 21 engages with a positional securing section 40 the recess 20 of the rim 13 of the receptacle on the longitudinal side 15 of the housing cover 3. The recess 20 is positioned approximately centrally between the holding-down devices 17.

After the circuit board 22 has been snapped into place, the sealing material of the sealing element 21 has been compressed by the length m so that a further positional fixation of the sealing element 21 in the filling space 31 is provided and at the same time the sealing action is ensured.

Figure 4:
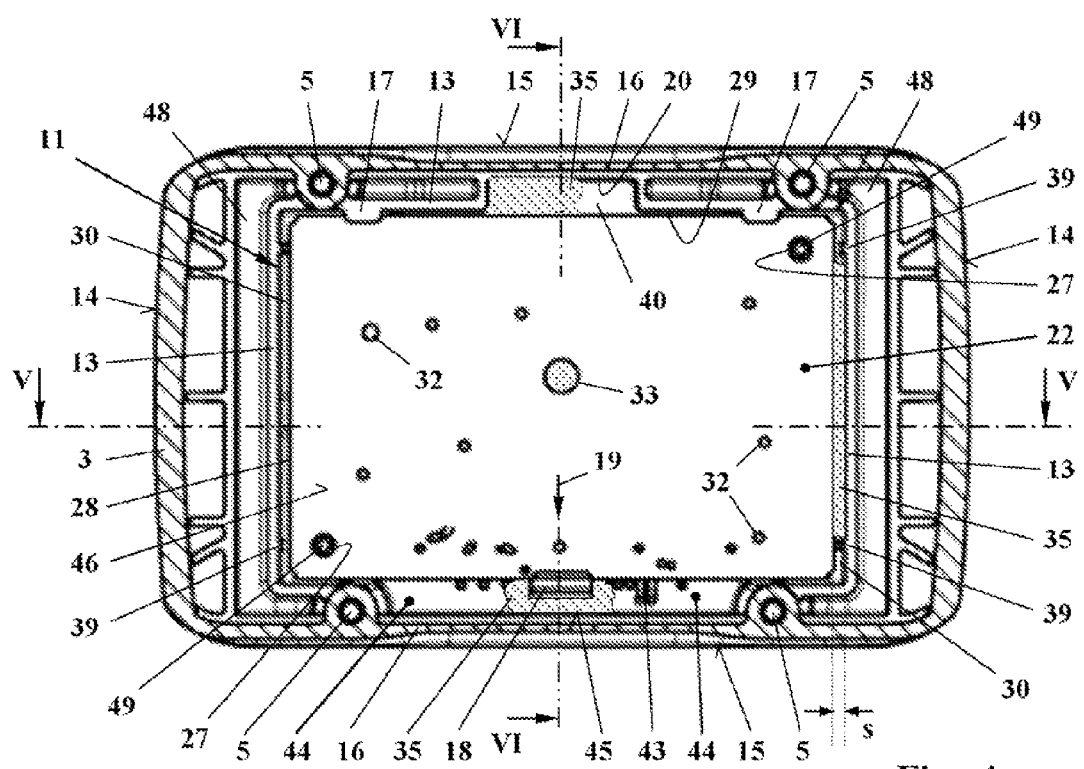
FIG. 4 is an interior view of the housing cover according to FIG. 2.
Figure 7:
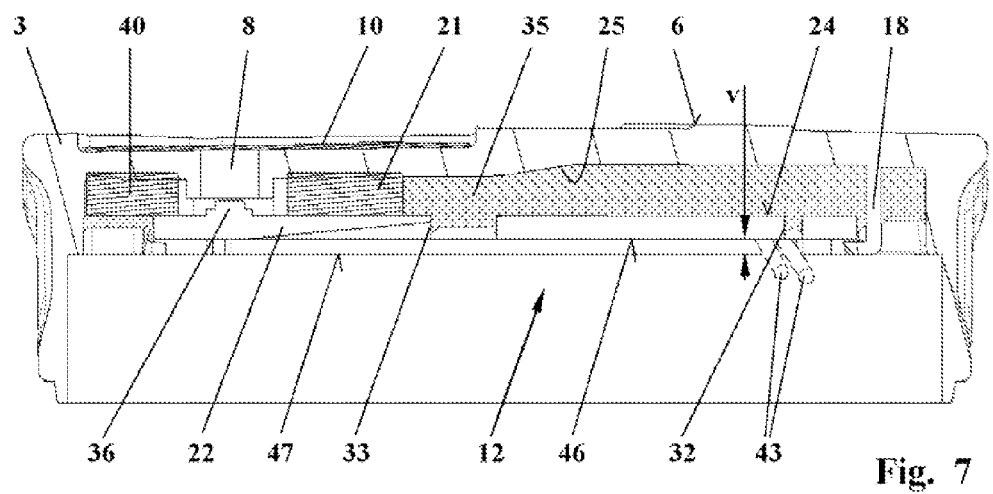
FIG. 7 is a section according to FIG. 6 of a filling space between the circuit board and the bottom of the receptacle that is filled with potting compound.

Through the potting opening 33 the liquid potting compound is filled into the filling space 31 and is distributed within the entire filling space 31 so that the electronic components 23 are completely enclosed or embedded. In this connection, a quantity of potting compound is filled in until potting compound rises in the gap 30. The FIGS. 4 and 7 show a section of a correspondingly potted filling space 31 wherein the potting compound has risen in the gap 30 so that all open spaces in the area of the edges of the circuit board 22 are safely closed or sealed. The filling level of the receptacle 11 is expediently at the level of the back 46 of the circuit board 22; however, it may also be positioned advantageously below the back 46 of the circuit board 22.

As an alternative or additional pouring opening, the remaining free sections 44 (FIG. 4) on either side of the locking hook 18 between the edge 29 of the circuit board and the rim 16 of the housing cover can be utilized. In the area of the positional securing section 40 of the sealing element 21 potting compound 35 is also filled in so as to close off or seal open edges in the area of the edge 29 of the circuit board.

Floating of the circuit board 22 on the liquid potting compound 35 is effectively prevented by the holding-down devices 17 and the locking hook 18. A positional change in the plane 41 of the circuit board 22 is prevented by the free ends 49 of the spacers 26 engaging the positioning openings 27 as well as by positioning stays 39 in the gap 30 between the edges 28 and 29 of the circuit board and the rim 13 of the receptacle.

Figure 3:
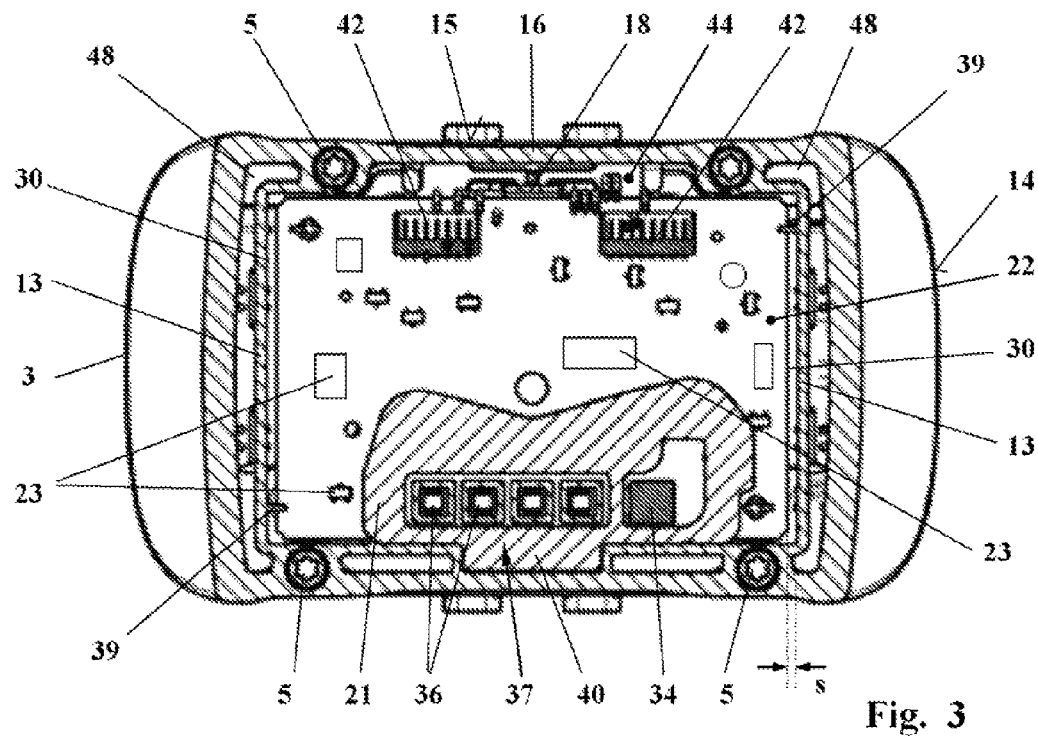
FIG. 3 is a detail view of the housing cover along the section line III-III in FIG. 1.

As can be seen in FIG. 3, on the furnished circuit board side 24 plugs 42 or sockets for connecting leads 43 are provided. Since the plugs 42 or sockets are positioned in the filling space 31, they are potted with the connected socket or plug so that the connecting leads 43 together with their plugs or sockets are completely enclosed or embedded in the potting compound 35 and thus fixedly secured.

As shown in FIG. 4, on either side of the locking hook 18 free sections 44 are provided through which the connecting leads 43 can be passed. The free sections 44 are positioned within the receptacle 11 and are therefore also filled with potting compound upon filling in the potting compound 35 so that also the free space 45 between the locking hook 18 and the rim 16 is filled. In this way, it is achieved that the curable potting compound 35 that, when cured, will prevent as a locking member a yielding movement of the locking hook 18 in the direction of arrow 19.

FIG. 4 shows schematically the filling space 31 filled with the potting compound 35 wherein the cured potting compound has flowed into the gap 30 but does not flood the back 46 of the circuit board 22.

Figure 8:
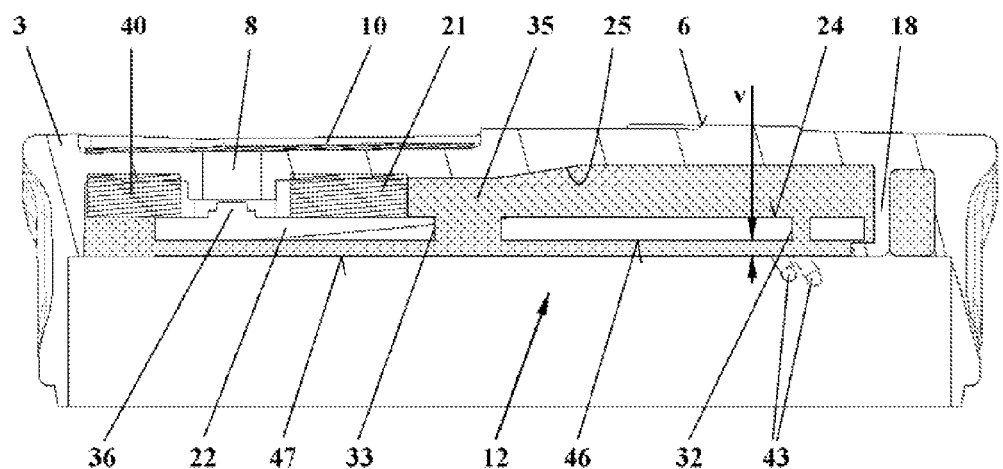
FIG. 8 is a section according to FIG. 6 of a receptacle that is completely filled with potting compound.

It can be expedient, as shown in FIG. 8, to fill in so much potting compound 35 into the receptacle 11 that also the back 46 of the circuit board is completely covered by the potting compound 35. The receptacle 11 is then filled to the upper edge 47 of the receptacle 11 completely with potting compound so that the circuit board 22 is completely enclosed in the cured potting compound. Expediently, in particular on the narrow sides 14 of the receptacle 11, an overflow groove 48 is provided, respectively, that serves for receiving possibly escaping potting compound.

It can be expedient to pass the connecting leads 43 at a suitable location through the gap 30 between the edge 28, 29 of the circuit board and the rim 13 of the receptacle in order to keep the free length of the leads as short as possible in the battery housing.

The specification incorporates by reference the entire disclosure of German priority document 10 2009 012 176.5 having a filing date of Feb. 27, 2009.

While specific embodiments of the invention have been shown and described in detail to illustrate the inventive principles, it will be understood that the invention may be embodied otherwise without departing from such principles.

What is claimed is:

1. A battery pack for an electric power tool, the battery pack comprising:
   a housing and a housing cover closing off said housing;
   battery cells arranged in said housing and electrically conductingly connected to one another;
   an electronic circuit for monitoring operating parameters of said battery cells, wherein said electronic circuit is mounted on a circuit board and is arranged in said housing;
   wherein said housing cover has an inner side facing said battery cells;
   wherein said inner side has a receptacle that is delimited by an outer receptacle rim;
   wherein said circuit board is received in said receptacle, wherein a circumferential edge of said circuit board delimits together with said receptacle rim a gap;
   wherein said receptacle comprises a locking hook that engages an edge of said circuit board;
   wherein said circuit board is spaced from a bottom of said receptacle so that a filling space is provided between said circuit board, said bottom of said receptacle, and said receptacle rim;
   a cured potting compound filling out said filling space such that the potting compound has risen into the gap and all open spaces in the area of the edges of the circuit board are safely sealed.

2. The battery pack according to claim 1, wherein electronic components of said electronic circuit are supported on said circuit board and are positioned in said filling space.

3. The battery pack according to claim 1, wherein said circuit board has a furnished side furnished with electronic components of said electronic circuit, wherein said furnished side faces said bottom of said receptacle.

4. The battery pack according to claim 1, further comprising spacers that secure said circuit board at a predetermined minimal spacing relative to said bottom of said receptacle.

5. The battery pack according to claim 4, wherein said spacers have free ends that engage positioning openings of said circuit board.

6. The battery pack according to claim 5, wherein said spacers engage said positioning openings with form fit.

7. The battery pack according to claim 1, wherein said receptacle rim is formed about a portion of a circumference of said receptacle by a rim of said housing cover.

8. The battery pack according to claim 1, wherein said gap extends circumferentially around said circuit board.

9. The battery pack according to claim 1, wherein said receptacle rim projects past said circuit board in a direction away from said bottom.

10. The battery pack according to claim 1, comprising a holding-down device arranged on said receptacle rim, wherein said holding-down device engages an edge of said circuit board.

11. The battery pack according to claim 1, wherein said locking hook is a springy locking hook.

12. The battery pack according to claim 1, comprising a holding-down device arranged on said receptacle rim, wherein said locking hook is a springy locking hook, wherein said holding down-device and said locking hook engage opposed edges of said circuit board.

13. The battery pack according to claim 1, comprising at least one operating means selected from a display element and an actuating element and further comprising a sealing element, wherein said at least one operating means is arranged in said bottom of said receptacle and wherein said sealing element surrounds said at least one operating means and extends across a height of said filling space.

14. The battery pack according to claim 13, wherein said sealing element is comprised of foam material.

15. The battery pack according to claim 14, wherein said foam material is foam rubber.

16. The battery pack according to claim 13, wherein said sealing element has a positional securing section that engages a recess of said receptacle rim.

17. The battery pack according to claim 13, wherein said sealing element is clamped between said circuit board and said bottom of said receptacle.

18. The battery pack according to claim 1, wherein said circuit board has a furnished side furnished with electronic components of said electronic circuit, wherein said furnished side comprises a connecting plug with connecting leads, wherein said connecting plug and said connecting leads are enclosed by said cured potting compound.

19. The battery pack according to claim 1, wherein said receptacle has an overflow groove.

20. The battery pack according to claim 1, wherein said cured potting compound completely encloses said circuit board.

21. The battery pack according to claim 1, wherein said circuit board is provided with a pouring opening for filling in a liquid potting compound that cures to said cured potting compound.

22. The battery pack according to claim 1, wherein said circuit board is provided with a venting opening.

* * * * *